United States Patent
Yokokawa

(10) Patent No.: US 9,054,622 B2
(45) Date of Patent: Jun. 9, 2015

(54) METHOD OF CONTROLLING A CURRENT OF A MOTOR AND CONTROL DEVICE OF A MOTOR

(75) Inventor: Narutoshi Yokokawa, Mishima (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 715 days.

(21) Appl. No.: 13/884,239

(22) PCT Filed: Nov. 9, 2010

(86) PCT No.: PCT/JP2010/069952
§ 371 (c)(1),
(2), (4) Date: May 8, 2013

(87) PCT Pub. No.: WO2012/063325
PCT Pub. Date: May 18, 2012

(65) Prior Publication Data
US 2013/0221879 A1 Aug. 29, 2013

(30) Foreign Application Priority Data
Sep. 15, 2009 (JP) .................... 2009-212622

(51) Int. Cl.
H02P 21/00 (2006.01)
(52) U.S. Cl.
CPC .................... H02P 21/0035 (2013.01)
(58) Field of Classification Search
CPC ........................ H02P 21/00; H02P 21/0035
USPC ........ 318/400.02, 400.22, 609, 619, 621, 632
See application file for complete search history.

(56) References Cited

U.S. PATENT DOCUMENTS

| 2006/0001392 A1 | 1/2006 | Ajima et al. |
| 2006/0049792 A1 | 3/2006 | Chen et al. |

FOREIGN PATENT DOCUMENTS

| JP | 09-084400 | 3/1997 |
| JP | 2001-197778 | 7/2001 |
| JP | 2004-229487 | 8/2004 |
| JP | 2004-321000 | 11/2004 |
| JP | 2006-020381 | 1/2006 |
| JP | 2006-081287 | 3/2006 |

(Continued)

OTHER PUBLICATIONS

English Language Abstract for JP 2001-197778 published on Jul. 19, 2001.

(Continued)

*Primary Examiner* — Bentsu Ro
(74) *Attorney, Agent, or Firm* — DLA Piper LLP (US)

(57) ABSTRACT

The present invention is a control device of a motor, for drawing out a capacity of the motor as much as possible so as to achieve a high-speed high-output performance thereof while securing a stability, including: a converter unit configured to rectify and smooth an AC voltage, and to output a DC main circuit voltage; an inverter unit configured to pass a current for driving the motor, with the use of the main circuit voltage; a current detector configured to detect an armature current passing through the motor; a position detector disposed on the motor, the position detector being configured to detect a motor speed; and a current control unit configured to control, upon reception of a q-axis current command (Iqr), the armature current passing through the motor, by outputting a signal for driving the inverter unit, with the use of data from the current detector and data from the position detector.

4 Claims, 4 Drawing Sheets

(56) References Cited

FOREIGN PATENT DOCUMENTS

| JP | 2007-151294 | 6/2007 |
|---|---|---|
| WO | WO 2009/063786 | 5/2009 |

OTHER PUBLICATIONS

English Language Translation for JP 2001-197778 published on Jul. 19, 2001.
English Language Abstract for JP 09-084400 published Mar. 28, 1997.
English Language Translation for JP 09-084400 published Mar. 28, 1997.
English Language Abstract for JP 2007-151294 published Jun. 14, 2007.
English Language Translation for JP 2007-151294 published Jun. 14, 2007.
English Language Abstract for JP 2006-081287 published Mar. 23, 2006.
English Language Translation for JP 2006-081287 published Mar. 23, 2006.
English Language Abstract for JP 2006-020381 published on Jan. 19, 2006.
English Language Translation for JP 2006-020381 published on Jan. 19, 2006.
International Search Report issued in PCT/JP2010-069952 dated Feb. 8, 2011.
English Language Translation for International Search Report issued in PCT/JP2010-069952 dated Feb. 8, 2011.
International Preliminary Report on Patentability issued in PCT/JP2010/069952 dated Feb. 19, 2013.
English Language Translation of International Preliminary Report on Patentability issued in PCT/JP2010/069952 dated Feb. 19, 2013.
Japanese Office Action issued in JP 2009-212622 on Dec. 27, 2013.
English Language Translation of Japanese Office Action issued in JP 2009-212622 on Dec. 27, 2013.
English Language Abstract and Translation of JP 2004-229487 published Aug. 12, 2004.
English Language Abstract and Translation of JP 2004-321000 published on Nov. 11, 2004.

Ki : PROPORTIONAL GAIN
ωp : FILTER CONSTANT
ωd : INTEGRAL CONSTANT
s : LAPLACE OPERATOR

METHOD OF CONTROLLING A CURRENT OF A MOTOR AND CONTROL DEVICE OF A MOTOR

CROSS REFERENCE TO RELATED APPLICATIONS

This application is a U.S. National Stage Application of International Application No. PCT/JP2010/069952 filed Nov. 9, 2010.

TECHNICAL FIELD

The present invention relates to a control device of a motor. In particular, the present invention pertains to a method of controlling a current of a motor and a control device of a motor, for achieving a high-speed high-output performance thereof while securing its stability, by passing a suitably controlled d-axis current through a d-q converted armature of the motor.

BACKGROUND ART

A motor is driven by applying a line-to-line voltage to the motor so as to pass a current through an armature of the motor. On the other hand, when the motor is rotated, a counter electromotive voltage occurs. When the applied voltage is higher than the counter electromotive voltage, a current flows so that the motor can be driven. When the number of rotations of the motor increases, the counter electromotive voltage increases. Since there is an upper limit of the voltage to be applied, there finally occurs a voltage saturation in the armature of the motor and thus the current cannot flow any more. Thereby, it becomes impossible to drive the motor because of lack of a torque.

In order to obtain a larger torque, it is necessary to increase the voltage to be applied. However, a large equipment is necessary therefor, which is expensive. Alternatively, it can be considered that capacities of the motor and an inverter that drives the motor are increased. However, this solution also needs a high cost and is undesirable. Thus, costless methods of preventing occurrence of the voltage saturation in order to generate a larger torque have been recently proposed.

As a method of preventing occurrence of the voltage saturation in an armature of a motor, there has been proposed a method of controlling a current which can achieve a higher-speed higher-output performance, by passing a d-axis current through the armature in which a d-axis direction corresponds to a direction of a magnetic field in the motor, so as to reduce a counter electromotive voltage that occurs when the motor is rotated, whereby a q-axis current for generating a torque can be increased (see, e.g., JP9-84400A).

In addition, as a method of achieving a higher output performance, there has been proposed a control method which can increase an effective voltage as compared with a general case where a sinusoidal phase voltage is supplied to each phase, by making a line-to-line voltage waveform into a rectangular or pseudo-rectangular waveform (see, e.g., JP3939481B).

Although the control method disclosed in JP9-84400A is stable, it cannot be said that the capacity of the motor is drawn out as much as possible, when a circuit of an inverter for driving the motor is sufficiently enough. This is because a reactive current is controlled to be passed at a set speed, which is near to a speed at which a voltage saturation occurs. On the other hand, since the control method disclosed in JP3939481B makes a line-to-line voltage waveform into a rectangular or pseudo-rectangular waveform, the capacity of the motor can be drawn out as much as possible when the circuit of the inverter for driving the motor is sufficiently enough. However, this method lacks a stability, and there is a possibility that the current control becomes unstable in the worst case.

SUMMARY OF THE INVENTION

The object of the present invention is to provide a method of controlling a current and a control device thereof, which can draw out a capacity of a motor as much as possible so as to achieve a high-speed high-output performance, while securing a stability.

In order to achieve the aforementioned object, a control device of a motor of the present invention, for drawing out a capacity of the motor as much as possible so as to achieve a high-speed high-output performance thereof while securing a stability, includes: a converter unit configured to rectify and smooth an AC voltage, and to output a DC main circuit voltage; an inverter unit configured to pass a current for driving the motor, with the use of the main circuit voltage; a current detector configured to detect an armature current passing through the motor; a position detector disposed on the motor, the position detector being configured to detect a motor speed; and a current control unit configured to control, upon reception of a q-axis current command (Iqr), the armature current passing through the motor, by outputting a signal for driving the inverter unit, with the use of data from the current detector and data from the position detector.

The current control unit includes: a limit processing unit configured to calculate, upon the reception of the q-axis current command (Iqr), the q-axis current limit value (Iqlimit) with the use of a maximum value (Imax) of a composite current of q-axis and d-axis and the below-described d-axis current command (Idr), to limit the q-axis current command (Iqr) such that the Iqr does not become equal to or greater than a q-axis current limit value (Iqlimit) to obtain a q-axis current limit command value (Iqrl), and to turn on a limit flag which informs a superordinate control unit for controlling a speed and so on of limitation of the q-axis current command, when the q-axis current command is limited, in order to prevent overshoot of the speed and so on; a PI compensation unit for improving a gain; a VqLimit processing unit (for Vq) configured to limit a voltage command (Vq), which has been outputted by the PI compensation unit, to a limit value, which has been preset by limitation of a component and so on used in the control device, and a VdLimit processing unit (for Vd); a two-phase to three-phase conversion unit configured to convert a two-phase voltage (Vql and Vdl), which has been outputted by the VqLimit Processing unit and the VdLimit Processing unit, to a three-phase voltage, in order to actually driving the motor; a PWM conversion unit configured to convert a signal, which has been outputted by the two-phase to three-phase conversion unit, to a pulse; a d-axis current command generation unit configured to obtain the Idr with the use of the Vql, the Vdl and the below-described electric angular velocity (ω); a current detection unit configured to convert a signal from the current detector to data which can be processed by the current control unit; a three-phase to two-phase conversion unit configured to convert a three-phase current of respective phases, which has been outputted by the current detecting unit, to a two-phase current; and a position detecting unit configured to convert a signal from the position detector to data which can be processed by the current control unit.

According to the present invention, there can be provided a method of controlling a current and a control device thereof, which can draw out a capacity of a motor as much as possible so as to achieve a high-speed high-output performance, while securing a stability.

MODES FOR CARRYING OUT THE INVENTION

An example of the present invention will be described herebelow.

Example 1

Figure 1:
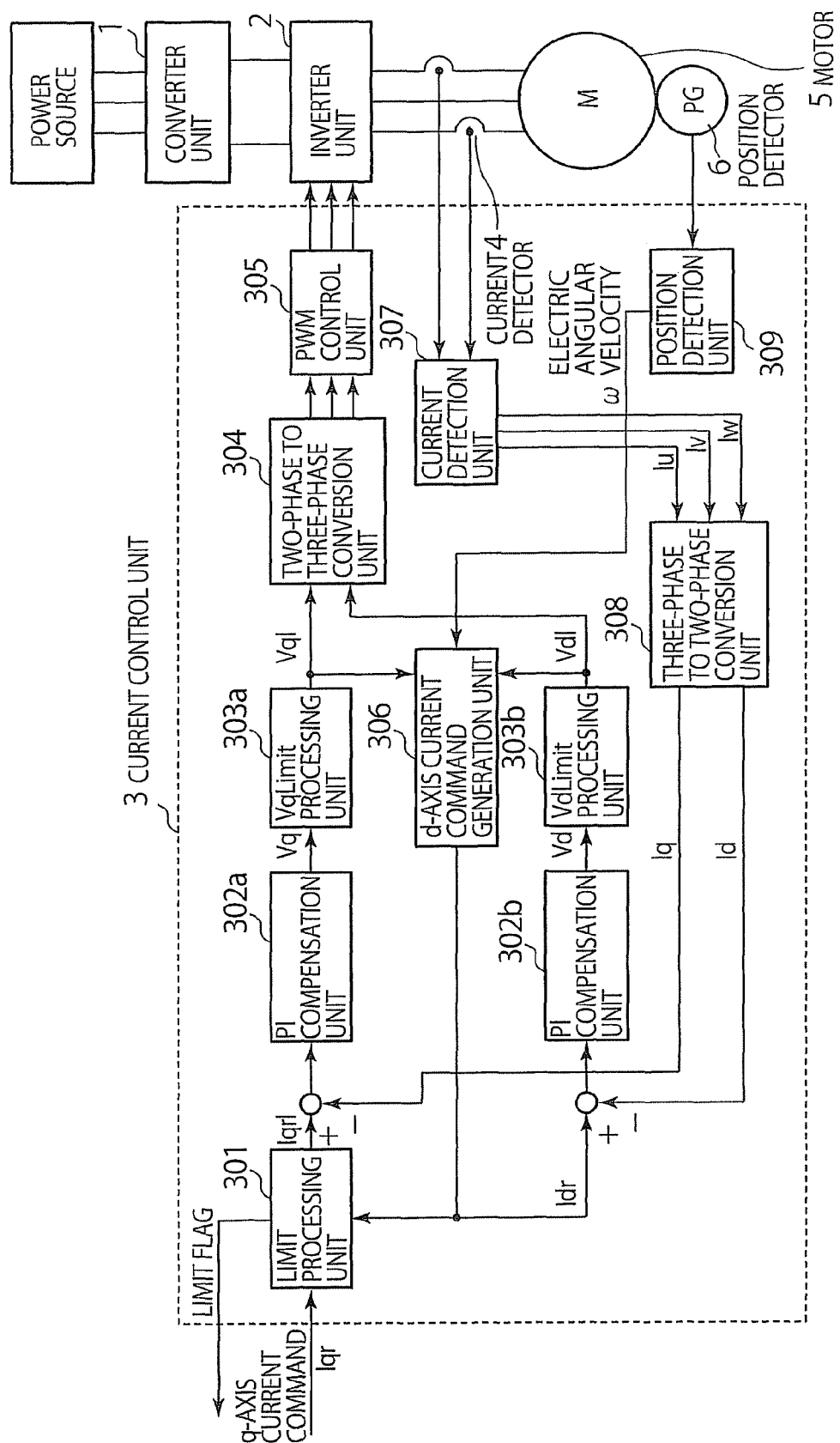
FIG. 1 is a block diagram of an example of the method of controlling a current and the control device thereof according to the present invention.

Example 1 of the method of controlling a current and the control device thereof according to the present invention is described with reference to FIG. 1. FIG. 1 is a block diagram showing the Example 1 according to the present invention. A power source in FIG. 1 shows an AC power source which supplies an AC voltage. The block diagram shows the method of controlling a current of a motor and the control device thereof, wherein: the supplied AC voltage is rectified and smoothed by a converter unit 1, and a main circuit DC voltage is outputted; and for the main circuit DC voltage, an inverter unit 2 is switched based on a control signal outputted from a current control unit 3, so as to drive a motor 5. A limit flag outputted by the current control unit 3 informs a superordinate control unit for controlling a speed and so on, of limitation of a q-axis current command, in order to prevent overshoot of the speed and so on.

The current control unit 3 shown in FIG. 1, which controls an armature current passing through the motor, is explained below.

Upon reception of a q-axis current command (hereinafter referred to as "Iqr") from outside, a limit processing unit 301 calculates a q-axis current limit value (hereinafter referred to as "Iqlimit") from an expression $\sqrt{(Imax^2 - Idr^2)}$ with the use of a maximum value (Imax) of a composite current of q-axis and d-axis and the below-described d-axis current command (hereinafter referred to as "Idr").

Figure 2:
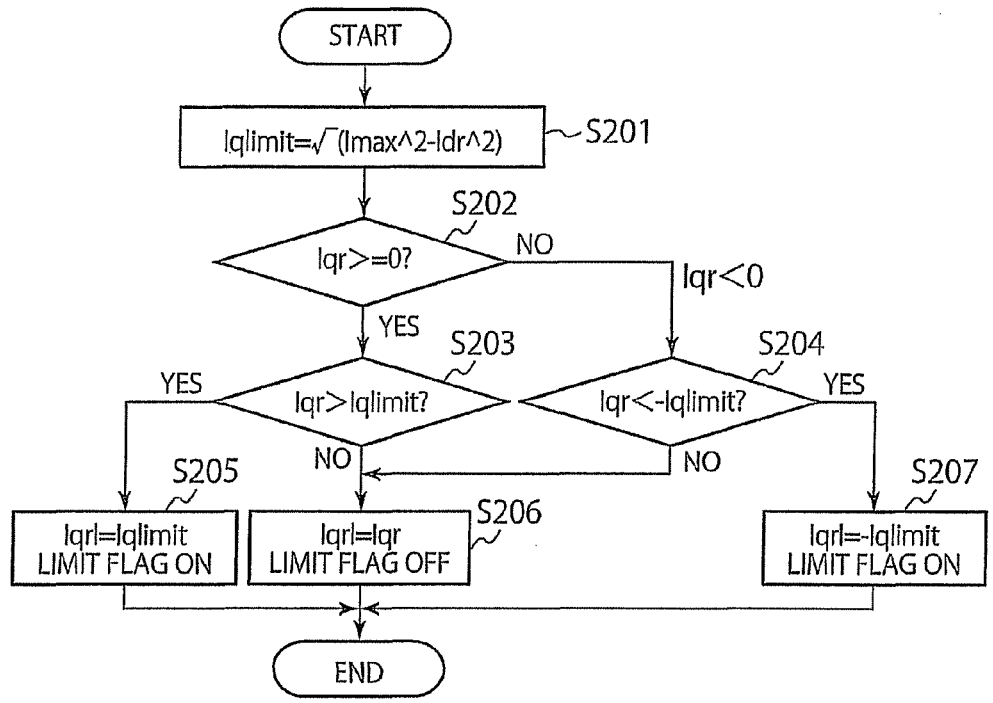
FIG. 2 is a flowchart of a limit processing unit.

In turn, when Iqr is equal to or greater than 0 and is greater than Iqlimit, a q-axis current limit command value (hereinafter referred to as "Iqrl") is limited to Iqlimit, and the limit flag is turned on. When Iqr is equal to or greater than 0 and is equal to or less than Iqlimit, or when Iqr is less than 0 and is equal to or greater than −Iqlimit, the Iqrl is made into Iqr, and the limit flag is turned off. When Iqr is less than 0 and is less than −Iqlimit, Iqrl is limited to −Iqlimit, and the limit flag is turned on. Iqrl is obtained as described above, and is outputted by the limit processing unit 301 (see FIG. 2 about details).

Figure 3:
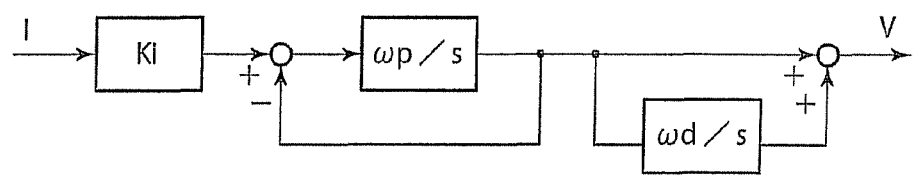
FIG. 3 is a block diagram of a PI compensation unit.

Then, Iqrl outputted by the limit processing unit 301 is subtracted by a q-axis current (hereinafter referred to as "Iq"), which actually passes through the motor, and then is inputted into a PI compensation unit 302a for increasing a gain (see FIG. 3 about details). A voltage command (hereinafter referred to as "Vq") outputted by the PI compensation unit 302a is inputted into a VqLimit processing unit 303a configured to limit Vq to a limit value, which has been preset by limitation of a component and so on used in the control device.

The VqLimit processing unit 303a sets ½ of the main circuit DC voltage as a limit voltage VLimit (VLimit can be increased to the main circuit DC voltage/2×1.15 with the use of a method in which neutral point is moved to increase a phase voltage so as to increase a torque). When Vq is greater than VLimit, Vq is clamped to VLimit. Then, a clamped q-axis voltage command (hereinafter referred to as "Vql") is outputted.

In addition, the below-described Idr is subtracted by a d-axis current (hereinafter referred to as "Id"), which actually passes through the motor, and then is inputted into a PI compensation unit 302b. A voltage command (hereinafter referred to as "Vd") outputted by the PI compensation unit 302b is inputted into a VdLimit processing unit 303b configured to limit Vd to a preset limit value.

When Vd is greater than the above-described VLimit, Vd is clamped to VLimit. Then, a clamped d-axis voltage command (hereinafter referred to as "Vdl") is outputted.

A two-phase clamped voltage command (Vql and Vdl), which has been outputted by the VqLimit Processing unit 303a and the VdLimit Processing unit 303b, is inputted into a two-phase to three-phase conversion unit 304, which is configured to convert the two-phase voltage command to a three-phage voltage, in order to actually drive the motor (the contents of the two-phase to three-phase conversion unit 304 are generally known, and thus explanations thereof are omitted. See various documents for reference). A PWM conversion unit 305, which is configured to convert a signal outputted by the two-phase to three-phase conversion unit 304 to a pulse, drives the inverter unit to drive the motor (the PMW conversion unit 305 does not directly affect the present invention and thus explanations thereof are omitted. See various documents for reference).

A current detection unit 307, which is configured to convert a signal from the current detector 4 to data that can be processed by the current control unit 3, calculates the remaining third phase current from an expression lv=−(lu+lw) with the use of the two phase currents, and outputs those currents, according to the explanation of FIG. 1. Alternatively, the current detection unit 307 may only convert to data which can be processed by the current control unit 3, with current detectors being provided respectively for three phases.

A three-phase to two-phase conversion unit 308, which is configured to convert a three-phase current of respective phases outputted by the current detecting unit 307 to a two-phase current, outputs Iq and Id.

A position detecting unit 309, which is configured to receive a signal from the position detector 6 disposed on the motor, converts a signal from the position detector 6 to data that can be processed by the current control unit 3, differentiates the data, calculates and outputs an electric angular velocity ω of the motor.

A d-axis current command generation unit 306 calculates VdVqerr from an expression $VdVqerr = Vdl^2 + Vql^2 - VLimit^2$ when Vql is equal to or greater than 0 and the above-described ω is equal to or less than 0, or calculates VdVqerr from an expression $VdVqerr = Vdl^2 + -Vqr^2 - VLimit^2$ otherwise.

Figure 5:
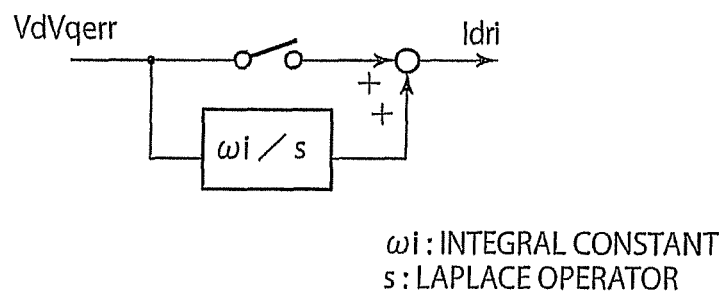
FIG. 5 is a block diagram of the integrating step S406 of FIG. 4.

An integrator having an integral constant ωi (see FIG. 5) carries out integral compensation (when a switch of FIG. 5 is off) or PI compensation (when the switch of FIG. 5 is on) for VdVqerr, and outputs Idri. As a method to turn the switch of FIG. 5 on or off, there are some approaches: turning the switch depending on parameters or the like based on controllability; turning the switch in real time depending on programs or the like; and so on.

Figure 4:
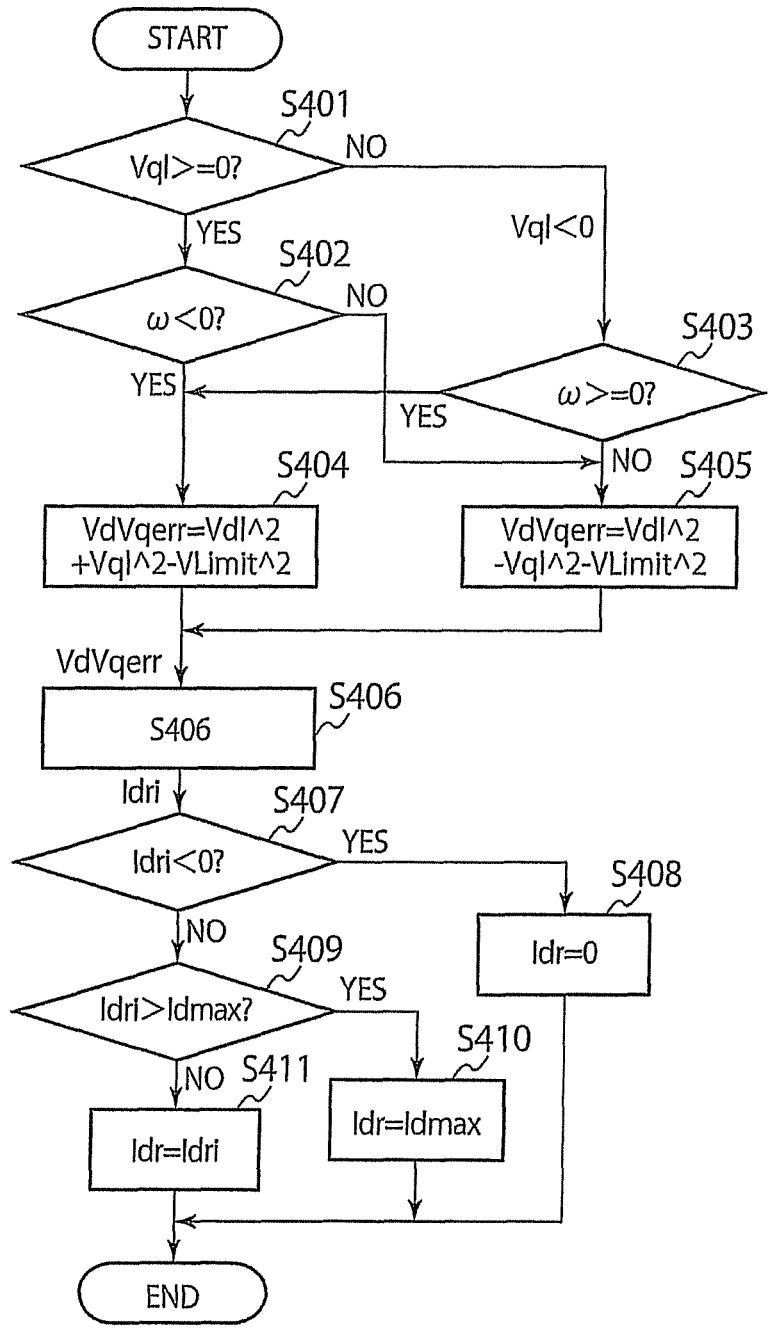
FIG. 4 is a flowchart of a d-axis current command generation unit.

When Idr is less than 0, Idr is made into 0. When Idr is equal to or greater than 0 and is greater than Idmax (Idmax is a constant value which has been obtained in advance depending on the characteristics of the motor. Idmax is usually the same as Imax, but may be different from Imax in some motors.), Idr is made into Idmax. When Idr is equal to or greater than 0 and is equal to or less than Idmax, Idr is made into Idri (see FIG. 4 about details).

The current control unit 3 carries out the above-described process.

The invention claimed is:

1. A control device of a motor, the control device of a motor including:
   a converter unit configured to rectify and smooth an AC voltage, and to output a DC main circuit voltage;
   an inverter unit configured to pass a current for driving the motor, with the use of the main circuit voltage;
   a current detector configured to detect an armature current passing through the motor;
   a position detector disposed on the motor, the position detector being configured to detect a motor speed; and
   a current control unit configured to control, upon reception of a q-axis current command (Iqr), the armature current passing through the motor, by outputting a signal for driving the inverter unit, with the use of data from the current detector and data from the position detector, wherein
   the current control unit includes:
   a current detection unit configured to convert a signal from the current detector to data which can be processed by the current control unit;
   a three-phase to two-phase conversion unit configured to convert a three-phase current of respective phases, which has been outputted by the current detection unit, to a two-phase current;
   a d-axis current command generation unit configured to generate a d-axis current command (Idr);
   a limit processing unit configured to calculate, upon the reception of the q-axis current command (Iqr), the q-axis current limit value (Iqlimit) from $\sqrt{(Imax^2-Idr^2)}$ with the use of a maximum value (Imax) of a composite current command value of q-axis and d-axis and the d-axis current command (Idr), and to make the q-axis current command (Iqr) to work such that: when the q-axis current command (Iqr) is equal to or greater than 0 and is greater than the q-axis current limit value (Iqlimit), a q-axis current limit command value (Iqrl) is limited to the q-axis current limit value (Iqlimit) and a limit flag is turned on; when the q-axis current command (Iqr) is equal to or greater than 0 and is equal to or less than the q-axis current limit value (Iqlimit) or when the q-axis current command (Iqr) is less than 0 and is equal to or greater than −Iqlimit, the q-axis current limit command value (Iqrl) is set to the q-axis current command (Iqr) and the limit flag is turned off; and when the q-axis current command (Iqr) is less than 0 and is less than −Iqlimit, the q-axis current limit command value (Iqrl) is limited to −Iqlimit and the limit flag is turned on;
   a PI compensation unit for increasing a gain, an output value (Iqrl) of the limit processing unit subtracted by a q-axis current (Iq), which corresponds to an output value of the three-phase to two-phase conversion unit, being inputted into the PI compensation unit;
   a VqLimit processing unit (for Vq) configured to limit a voltage command (Vq), which has been outputted by the PI compensation unit, to a preset limit value;
   a second PI compensation unit for increasing a gain, the d-axis current command (Idr) subtracted by a d-axis current (Id), which corresponds to an output value of the three-phase to two-phase conversion unit, being inputted into the second PI compensation unit;
   a VdLimit processing unit (for Vd) configured to limit a voltage command (Vq), which has been outputted by the second PI compensation unit, to a preset limit value;
   a two-phase to three-phase conversion unit configured to convert a two-phase voltage (Vql and Vdl), which has been outputted by the VqLimit processing unit and the VdLimit processing unit, to a three-phase voltage, in order to actually drive the motor; and
   a PWM conversion unit configured to convert a signal, which has been outputted by the two-phase to three-phase conversion unit, to a pulse.

2. A control device of a motor according to claim 1, wherein
   the current control unit further includes a position detection unit configured to calculate an electric angular velocity (ω) of the motor based on a signal from the position detector; and
   the d-axis current command generation unit compensates the d-axis current command (Idr) with the use of the two-phase voltage (Vql and Vdl) and the electric angular velocity (ω).

3. A method of controlling a current of a motor, with the use of a control device of a motor, the control device of a motor including:
   a converter unit configured to rectify and smooth an AC voltage, and to output a DC main circuit voltage;
   an inverter unit configured to pass a current for driving the motor, with the use of the main circuit voltage;
   a current detector configured to detect an armature current passing through the motor;
   a position detector disposed on the motor, the position detector being configured to detect a motor speed; and
   a current control unit configured to control, upon reception of a q-axis current command (Iqr), the armature current passing through the motor, by outputting a signal for driving the inverter unit, with the use of data from the current detector and data from the position detector, wherein
   the current control unit includes:
   a current detection unit configured to convert a signal from the current detector to data which can be processed by the current control unit;
   a three-phase to two-phase conversion unit configured to convert a three-phase current of respective phases, which has been outputted by the current detection unit, to a two-phase current;
   a d-axis current command generation unit configured to generate a d-axis current command (Idr);
   a limit processing unit configured to calculate, upon the reception of the q-axis current command (Iqr), the q-axis current limit value (Iqlimit) from $\sqrt{(Imax^2-Idr^2)}$ with the use of a maximum value (Imax) of a composite current command value of q-axis and d-axis and the d-axis current command (Idr), and to make the q-axis current command (Iqr) to work such that: when the q-axis current command (Iqr) is equal to or greater than 0 and is greater than the q-axis current limit value (Iqlimit), a q-axis current limit command value (Iqrl) is limited to the q-axis current limit value (Iqlimit) and a limit flag is turned on; when the q-axis current command (Iqr) is equal to or greater than 0 and is equal to or less than the q-axis current limit value (Iqlimit) or when the q-axis current command (Iqr) is less than 0 and is equal to or greater than −Iqlimit, the q-axis current limit command value (Iqrl) is made into the q-axis current command (Iqr) and the limit flag is turned off; and when the q-axis current command (Iqr) is less than 0 and is less than −Iqlimit, the q-axis current limit command value (Iqrl) is limited to −Iqlimit and the limit flag is turned on;

a PI compensation unit for increasing a gain, an output value (Iqrl) of the limit processing unit subtracted by a q-axis current (Iq), which corresponds to an output value of the three-phase to two-phase conversion unit, being inputted into the PI compensation unit;

a VqLimit processing unit (for Vq) configured to limit a voltage command (Vq), which has been outputted by the PI compensation unit, to a preset limit value;

a second PI compensation unit for increasing a gain, the d-axis current command (Idr) subtracted by a d-axis current (Id), which corresponds to an output value of the three-phase to two-phase conversion unit, being inputted into the second PI compensation unit;

a VdLimit processing unit (for Vd) configured to limit a voltage command (Vq), which has been outputted by the second PI compensation unit, to a preset limit value;

a two-phase to three-phase conversion unit configured to convert a two-phase voltage (Vql and Vdl), which has been outputted by the VqLimit processing unit and the VdLimit processing unit, to a three-phase voltage, in order to actually drive the motor; and a PWM conversion unit configured to convert a signal, which has been outputted by the two-phase to three-phase conversion unit, to a pulse.

4. The method of controlling a current of a motor according to claim 3, the method further including:

calculating an electric angular velocity ($\omega$) of the motor based on a signal from the position detector; and compensating the d-axis current command (Idr) with the use of the two-phase voltage (Vql and Vdl) and the electric angular velocity ($\omega$).

\* \* \* \* \*